Aug. 8, 1961     E. A. QUADE     2,995,727

MEANS FOR COMPARING WAVE SHAPES

Filed Oct. 29, 1957     5 Sheets-Sheet 1

INVENTOR.
EDWARD A. QUADE

BY *Richard E. Cummins*

ATTORNEY

Aug. 8, 1961     E. A. QUADE     2,995,727
MEANS FOR COMPARING WAVE SHAPES
Filed Oct. 29, 1957     5 Sheets-Sheet 2

United States Patent Office 2,995,727
Patented Aug. 8, 1961

2,995,727
MEANS FOR COMPARING WAVE SHAPES
Edward A. Quade, San Jose, Calif., assignor to International Business Machines Corporation, New York, N.Y., a corporation of New York
Filed Oct. 29, 1957, Ser. No. 693,130
27 Claims. (Cl. 340—149)

This invention relates in general to systems for comparing two signals to determine their similarity and, in particular, to a system wherein the comparison is made independently of the relative phase displacements of the two signals. The invention has particular importance in connection with automatic speech and character recognition systems in which each sound or character may be represented by a signal having a complex amplitude-vs.-time characteristic.

In accordance with the system of the present invention means are provided for comparing a predetermined unknown signal, obtained, for example, by sensing a printed character, with a plurality of stored reference signals, the frequency of the stored signals being either a multiple or sub-multiple of the frequency of the unknown signal. Each cycle of the one reference signal that corresponds to the unknown signal has a waveform which is similar to the form of the unknown signal but a different time base.

The comparing means includes a plurality of similar comparing units, each of which is associated with a different reference signal. Each of the units provides a pulse each time coincidence of a preselected nature occurs between the unknown signal and its associated reference signal so that a series of pulses is provided by each unit. It can be shown graphically and analytically that the series of pulses obtained from the comparing unit corresponding to the unknown character contains certain pulses which are spaced apart equally and that the frequency of these certain pulses is determined by the formula, $$f_c = \left(1 - \frac{1}{k}\right) f_r$$

where $f_c$=the frequency of the certain pulses, $f_r$=the frequency of the stored reference signal corresponding to the sensed character, and $k$=the multiple of the reference signal.

Beside the certain pulses $c$ generated by that comparing unit in response to coincidence, the series of pulses obtained by the comparing unit also includes a plurality of unequally spaced pulses $r$. Likewise, the other comparing units provide series of pulses which are unequally spaced. The system, therefore, includes pulse space detecting means comprising a suitable pulse spacing detector associated with each comparing unit for determining the comparing unit which is generating the series of pulses containing the certain pulses $c$ whose spacing conforms to the above mentioned formula. One of the important features of the present invention is that the spacing or frequency of the certain pulses $c$ generated by the comparing means is independent of the relative phase displacement between the unknown signal and its associated stored reference signal.

It is therefore an object of the present invention to provide an improved system for comparing two signals to determine the degree of their similarity.

Another object of the present invention is to provide an improved system for determining the similarity of two signals regardless of their relative phase displacements.

A further object of the present invention is to provide a system for recognizing information represented by predetermined amplitude-vs.-time function signals without controlling the time at which the information is presented to the system.

A still further object of the present invention is to provide a system for automatically processing printed information.

Other objects of the invention will be pointed out in the following description and claims and illustrated in the accompanying drawings which disclose, by way of example, the principle of the invention and the best mode which has been contemplated of applying that principle.

Figure 1:
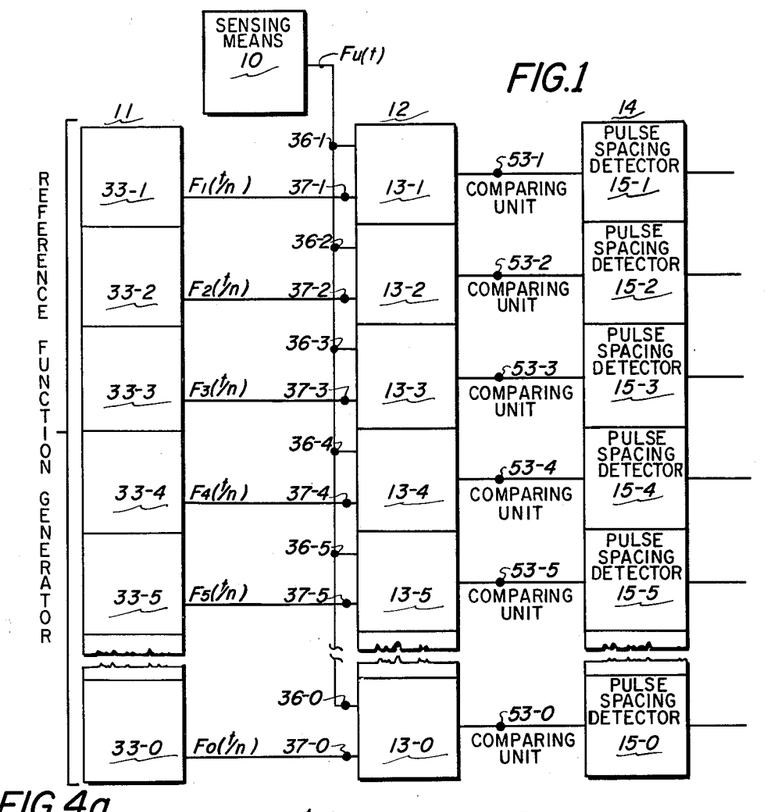
FIG. 1 is a diagrammatic view showing a system for comparing signals in accordance with the present invention.

Referring to the drawings and particularly to FIG. 1, the system shown therein comprises generally sensing means 10, a storage unit 11 for reference signals, comparing means 12 which includes a plurality of comparing units 13–1 through 13–0, and detector means 14 which includes a plurality of pulse spacing detectors 15–1 through 15–0.

The invention is described in connection with a character recognition system but is, of course, applicable to other types of systems.

Figures 2, 3:
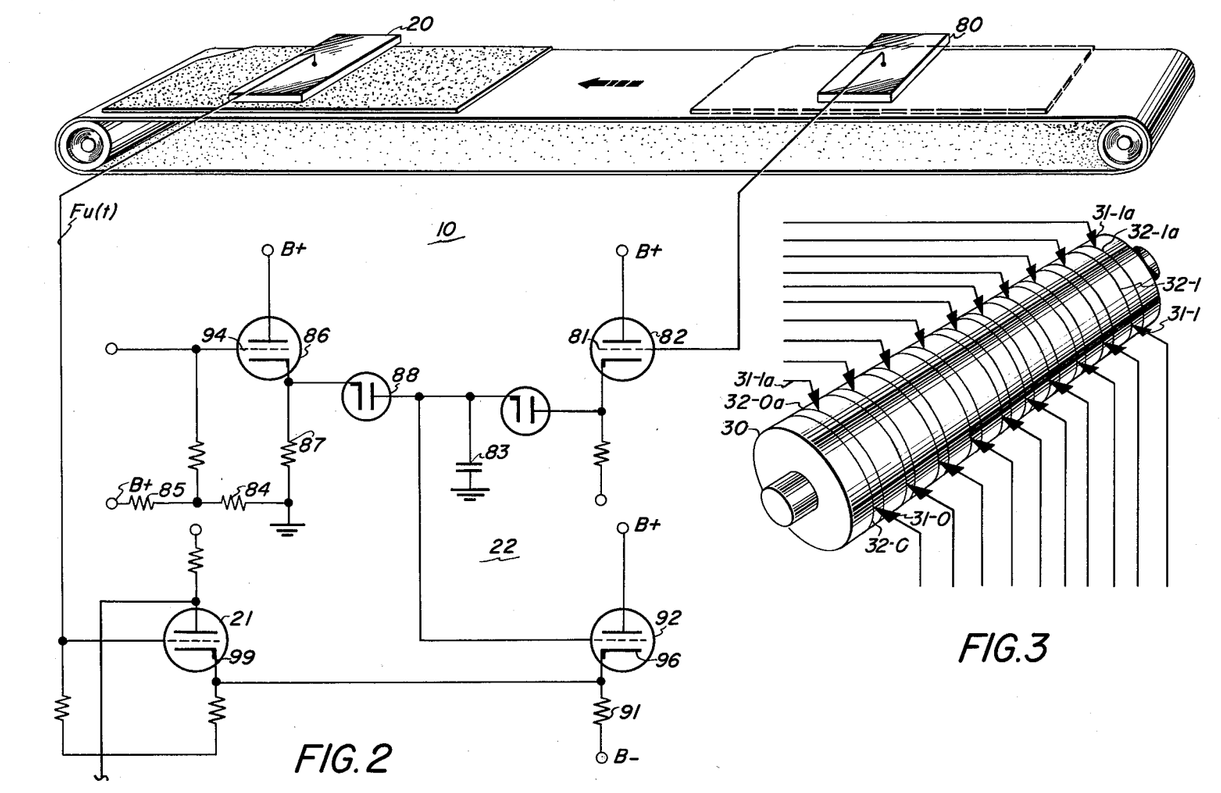
FIG. 2 is a schematic view of the sensing means shown diagrammatically in FIG. 1.
FIG. 3 is a schematic view of the reference signal storage device shown diagrammatically in FIG. 1.

The sensing means 10 shown in block diagram in FIG. 1 is illustrated schematically in FIG. 2 and comprises in the preferred embodiment a sensing device 20 which operates to translate a printed character (not shown) into a particular amplitude-vs.-time function signal dependent upon the rate at which the character is scanned. The means employed for obtaining relative movement between the sensing device 20 and the characters being scanned forms no part of the present invention and hence is shown more or less diagrammatically in FIG. 2 merely by a roller driven belt. However, other arrangements are possible. Likewise, sensing device 20 may be any of the devices known in the art, such as the various types of magnetic transducers or photoelectric transducers. The output of the sensing device 20 is connected to each of the comparing units 13 through a triode vacuum tube 21 which may be controlled by a suitable automatic gain control circuit 22, the operation and function of which is described later in the specification.

The storage unit 11 for the reference signals is shown schematically in FIG. 3 and comprises a recording surface 30 provided with a plurality of read transducers 31–1 through 31–0 positioned adjacent recording tracks 32–1 through 32–0. Each track 32 is associated with a different transducer 31 and has recorded thereon the amplitude-vs.-time signal representing one of the character signals, recorded at a frequency that is a multiple or sub-multiple of the scanning frequency.

Figures 4A, 4B:
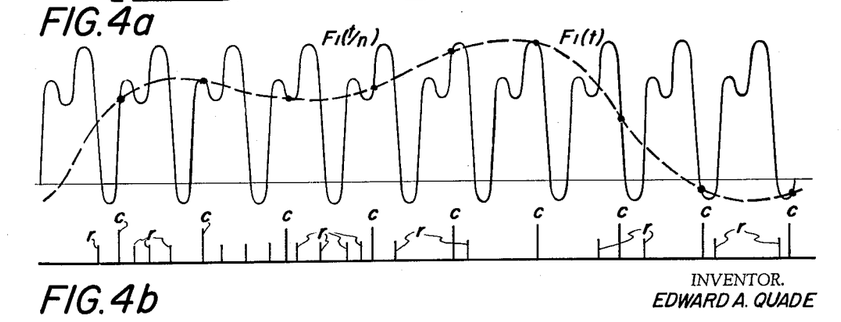
FIGS. 4a and 4b illustrate graphically the comparison of the predetermined unknown signal and its associated stored reference signal.

For example, the signal shown in FIG. 4a by the solid line designated $F_1(t/n)$ represents the signal recorded on track 32–1, while the signal shown by the dashed line designated $F_1(t)$ corresponds to the signal obtained from the sensing device 20 when that particular character, for example, a "1," is scanned. Each cycle of the signal $F_1(t/n)$ has a waveform whose shape is substantially the same as the "1" character signal $F_1(t)$. In practice, signal $F_1(t/n)$ may be obtained by recording on track 32–1 signal $F_1(t)$ with the drum surface 30 rotating a $1/n$ times its normal speed. As shown, reference signal $F_1(t/n)$ has a frequency which is ten times as large as the signal $F_1(t)$.

Each of the remaining tracks 32–2 through 32–0 has recorded thereon, at the multiple frequency, similar type signals which correspond to the other characters. Each of the recording tracks 32 with its associated transducer 31 may therefore be considered as a function generator 33. It should be noted that other types of function generators may be employed, if desired, in place of the magnetic drum surface and transducer arrangement which is shown in FIG. 3 for exemplary purposes only.

Referring again to FIG. 1, the signal generated by the sensing means 10 is fed simultaneously to the input terminals 36–1 through 36–0 of the comparing units 13 while the outputs of the transducers 31–1 through 31–0 or function generators 33 are connected respectively to input terminals 37–1 through 37–0 of the comparing units 13. The comparing units 13 are similar, so only one is described in detail.

Figure 5:
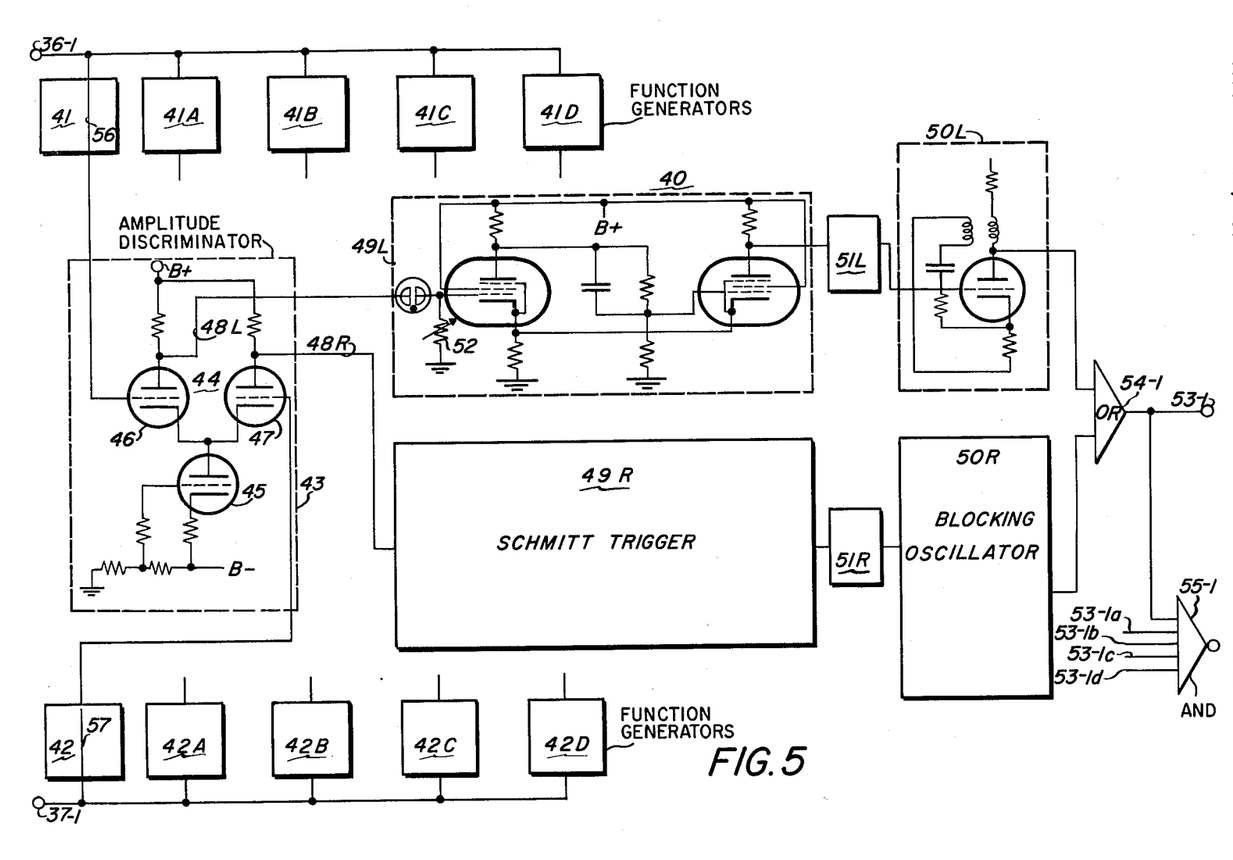
FIG. 5 is a schematic view of one of the comparing units shown diagrammatically in FIG. 1.

With reference to FIG. 5, the comparing unit 13–1 illustrated schematically therein comprises a plurality of comparison circuits 40, each of which is adapted to provide a series of pulses in response to coincidence of a particular nature between the character signal $F_1(t)$ from sensing device 20 applied to terminal 36–1 and the reference signal $F_1(t/n)$ from reference signal storage unit 11 applied to terminal 37–1. Since the comparison circuits 40 are similar, only one is shown in detail.

The comparison circuit 40 includes a pair of function generators 41 and 42 whose inputs are connected respectively to terminals 36–1 and 37–1 and whose outputs are connected to amplitude discriminator 43 which comprises a differential detector 44 and a constant current tube 45 connected in the cathode return to prevent common coupling effects between the triodes 46 and 47 which form the differential detector 44. Plate circuit 48L of the detector 44 is connected to a level sensitive device such as Schmitt trigger 49L which in turn is connected to a blocking oscillator 50L through a differentiating and clamping arrangement 51L to provide triggering pulses for the blocking oscillator 50L. Plate circuit 48R is connected to Schmitt trigger 49R which in turn is connected to blocking oscillator 50R through differentiating and clamping unit 51R. The differentiating and clamping arrangements 51L and 51R are shown diagrammatically by boxes in that the specific details of the circuits per se within the boxes form no part of the present invention and since various arrangements known in the art may be employed. Reference may be had to various texts for the details and operation of the differentiating and clamping arrangements. The first edition of the work entitled "Electronic Circuits and Tubes" by the Cruft Electronics Staff, published in 1947, illustrates and describes in chapter 24, sections 20 and 21, the details and operation of differentiating and clamping arrangements suitable for use in the present invention. The output pulses generated by the blocking oscillators 50 are applied to output terminal 53–1 through "or" gate 54. Two Schmitt triggers 49 of the comparison unit 40 are employed to overcome the "hysteresis" of their input trigger levels and also to allow an adjustable range over which triggering can occur. The trigger level may be adjusted on both Schmitt triggers by resistors 52 which provide a means of setting the upper and lower limits of the trigger range independently. "Coincidence" may therefore occur over a voltage range rather than at an exact voltage value.

The comparing unit 13–1 as shown in FIG. 5 is adapted to provide a series of pulses at terminal 53–1 in response to coincidence of a predetermined nature between the signal $F_u(t)$ from the sensing device 20 and the reference signal $F_1(t/n)$ stored on track 32–1 of drum surface 30. The nature of coincidence chosen for comparison circuit 40 is amplitude, and therefore the function generators 41 and 42 in practice may comprise either a linear amplifier or simply a pair of conductors 56 and 57, as shown. Other comparison circuits 40A–40D (not shown) are also provided. These comparison circuits are similar to comparison circuit 40 except that the function generators 41 and 42 are replaced by other function generators 41A through 41D and 42A through 42D. The other comparison circuits each operate in response to coincidence of a different nature, such as slope, etc. The function generators 41–41d and 42–42d are shown diagrammatically by boxes in that the specific details of the circuits per se within the boxes form no part of the present invention and since various arrangements known in the art may be employed. Reference may be had to various texts for details and operation of function generators. The work entitled "Electronic Analog Computers," by Korn and Korn (Library of Congress Catalog Card No. 51–12622), published by McGraw-Hill Book Co., illustrates and describes in chaper 6 suitable function generators which may be employed in the present system.

The unknown signal $F_u(t)$ from the sensing device 20 causes a pulse at terminal 53–1 each time the signal $F_u(t)$ has the same amplitude as the signal $F_1(t/n)$. Similar pulses are also provided at the output terminals 53–2 through 53–0 of the other comparing units 13–2 through 13–0 when the amplitudes of their respective signals coincide with signal $F_u(t)$.

Assuming that a character "1" is being sensed, the unknown signal $F_u(t)$ from sensing device 20 corresponds to the "1" character signal $F_1(t)$ shown in FIG. 4a. A series of pulses shown in FIG. 4b is therefore provided at terminal 53–1. With reference to FIG. 4b, it will be noted that this series of pulses contains certain pulses $c$ which are equally spaced and other pulses $r$ which are not equally spaced. As discussed earlier in connection with FIG. 4a, the signal $F_1(t/n)$ was recorded at ten times the frequency of its associated signal $F_1(t)$. Therefore, the pulse train defined by the certain pulses $c$ has a frequency which is $9/10$ the frequency of the signal $F_1(t/n)$.

While the other comparing units 13–2 through 13–0 provide series of pulses to their respective terminals 53–2 through 53–0 in a manner similar to that just described, these pulse trains do not contain the certain pulses $c$ having a predetermined spacing.

Figure 6:
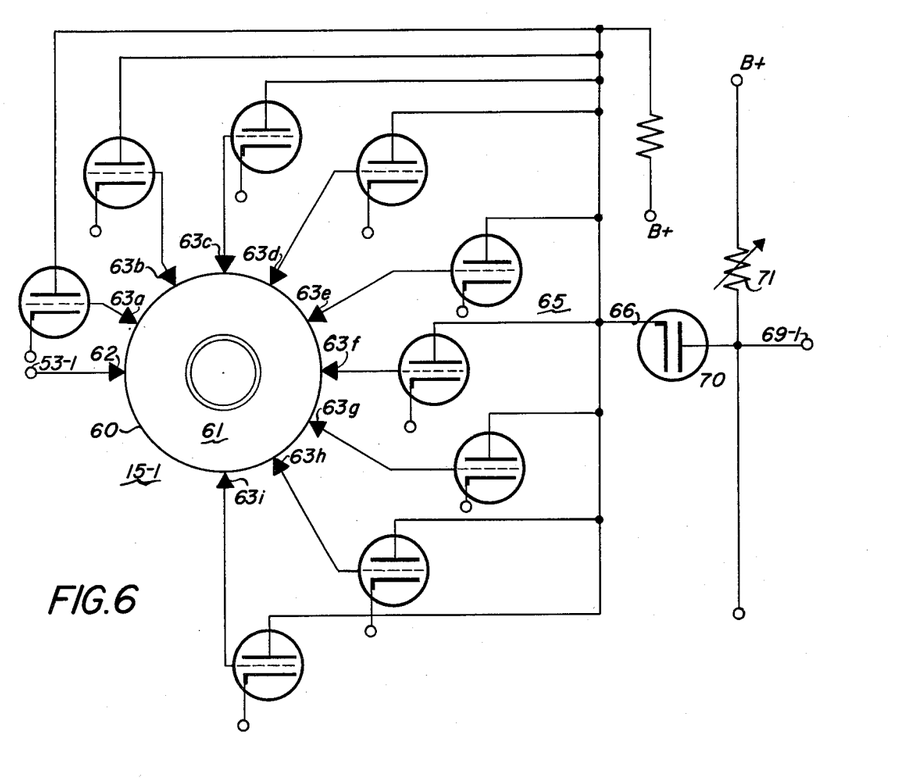
FIG. 6 is a schematic view of one of the pulse spacing detector units shown diagrammatically in FIG. 1.

In order to provide an indication that the series of pulses from "or" gate 54–1 of the comparing unit 13–1 shown in FIG. 5 includes the certain pulses $c$ having the correct spacing, the system is provided with a plurality of pulse spacing detectors 15 which are similar, so only one is shown in detail in FIG. 6.

The pulse spacing detector 15–1 shown in FIG. 6 is associated with comparing unit 13–1 and comprises a recording surface 60 shown as a drum 61, a write transducer 62 and a plurality of read transducers 63a through 63i. The output terminal 53–1 of comparing unit 13–1 is connected to the write transducer 62 so that the surface of drum 61 accepts information in accordance with the series of pulses generated by comparison circuit 40–1. The plurality of read transducers 63 are positioned along the recording track traced by the write transducer 62 and spaced apart equally in accordance with the predetermined frequency of the certain pulses $c$. The output of each read transducer 63 is connected to a voltage summing device 65 whose output 66 is connected to the output terminal 69–1 of the pulse spacing detector 15–1 through a clamping arrangement 70. Write transducer 62 causes the pulse train (shown in FIG. 4b) to be recorded on drum 61. The spacing of the read transducers 63 and the rotation of drum 61 are coordinated with the frequency of the certain pulses $c$ so that the information bits recorded by the pulses $c$ (shown in FIG. 4b) are read simultaneously by each of the read transducers 63. As a result, an indication pulse is provided at output terminal 69–1 in accordance with the sensing of any desired number of $c$ pulse bits. The number of $c$ pulse bits necessary to generate an indication pulse may be varied by adjusting the level of the clamping arrangement 70 by varying resistor 71.

Various known factors will affect the level determination chosen for the clamping arrangement 70. Some of these factors are the total number of different characters to be sensed, the similarity of the amplitude-vs.-time function signals generated by these characters, the number of pulses $r$ which might by chance have the same pulse spacing as the certain pulses $c$ (which may be determined in advance by a statistical analysis), and changes in amplitude of the character signal generated by the sensing device 20 resulting from variations in the ability to produce characters or variations caused by different printing methods.

If desired, the basic system may be provided with additional means for minimizing the effects which these factors might have on the purity of the system. For example, with regard to the amplitude variations caused by variations in printing, the system may be provided with any suitable automatic gain control circuit to insure that the peak amplitudes of the unknown signals $F_u(t)$ applied to input terminals 36–1 through 36–0 of the comparing units 13–1 through 13–0 are substantially the same as the peak amplitudes of the reference signals $F_1(t/n)$ through $F_0(t/n)$. The sensing means 10 shown in FIG. 2 illustrates schematically one arrangement for obtaining automatic gain control for the unknown signals $F_u(t)$. As shown therein, a sensing device 80 has its output connected to the grid 81 of a cathode follower 82 which allows condenser 83 to be charged to a value proportional to the peak voltage of the signal $F_u(t)$ generated by sensing device 80. Resistors 84 and 85 in the grid cathode circuit of triode 86 determine the grid voltage of triode 86 to produce a voltage across resistor 87 greater than the maximum voltage across the condenser 83, thereby preventing the diode 88 from conducting. Condenser 83 therefore remains charged. The voltage across resistor 91 of cathode follower 92 hence is directly proportional to the peak voltage of the input signal $F'_u(t)$ from device 80. At the completion of the character sensing operation, suitable means (not shown) supplies a negative-going pulse to the grid 94 of tube 86, causing tube 86 to cut off and allowing condenser 83 to discharge through diode 88 and resistor 87. Cathode 96 of cathode follower 92 is connected to the cathode 99 of amplifier 21 and thus controls the peak amplitude of the character signal $F_u(t)$ applied to the comparing units 13 from device 20. Such an arrangement overcomes signal variations between like characters resulting from differences in printing.

As mentioned previously, it may be possible under certain relative phase conditions of the signals being compared for two or three of the relatively randomly spaced pulses $r$ of the pulse train shown in FIG. 4b to have the same spacing as the certain pulses $c$. Likewise, a character signal not associated with the particular comparing unit might also produce a few pulses which have the correct spacing. It may therefore be desirable to choose coincidence of a different nature from amplitude, such as slope coincidence, for generating the pulse train applied to terminals 53. As mentioned in connection with the comparing unit 13–1 shown in FIG. 5, a number of comparison circuits 40A–40D similar to the comparison circuit 40 except for their respective function generators 41A through 41D and 42A through 42D are provided in each unit 13. The function generators 41A through 41D are connected between the input terminal 36–1 of the comparing unit 13–1 and the unknown signal input terminals of their respective amplitude discriminators 44. The reference signal input terminals of the amplitude discriminators 44 may be connected to the input terminal 37–1 of the comparing unit 13–1 through corresponding function generators 42A through 42D, as shown. If desired, the function generators 42A through 42D may be omitted and the signals which would be produced thereby recorded permanently on drum surface 30 on recording tracks 32–1a through 32–1d (only one of which is shown in FIG. 3), in which case additional read transducers 31–1a through 31–1d would be provided, their outputs being connected directly to the reference signal input terminals of the respective amplitude discriminators 44.

Referring again to FIG. 5, each of the function generators 41A through 41D operates to provide a signal which is a function of the unknown signal $F_u(t)$. For example, function generator 41A, referred to as the slope function generator, comprises a suitable differentiating circuit which provides a signal $F'_u[F_u(t)]$ which represents the slope of the unknown signal. In the example previously selected where the unknown signal $F_u(t)$ is the $F_1(t)$ signal, function generator 41A would provide a signal $F'_1[F_1(t)]$. Similarly, function generator 42A of comparing unit 13–1 would provide a signal $F'_1[F_1(t/n)]$. The $F'$ signals are thereafter treated in the same manner by the comparison circuit 40A as the original signals, that is, they provide a series of pulses in response to amplitude coincidence of the $F'$ signals. This series of pulses has $c'$ pulses which are in timed phased relationship with the $c$ pulses of FIG. 4b. However, random pulses $r'$ are spaced entirely differently from the random pulses $r$ of FIG. 4b.

If the output terminal 53–1a of the comparison circuit 40A is "anded" with the output terminal 53–1 from comparison circuit 40 by means of "and" gate 55–1, as shown in FIG. 3, the number of pulses $r$ or $r'$ which reach the pulse spacing detector 15–1 is greatly reduced. It will be seen that if the other comparison circuits 40B, 40C and 40D, responsive to coincidence of some other nature besides amplitude and slope, are also employed, the possibility of an unwanted pulse passing through "and" gate 55–1 is practically negligible, in which case random pulse considerations would probably not affect the level determination for the pulse spacing detectors 15.

Where a large number of different characters are being sensed or where there are a number of characters whose signals differ only slightly, their difference may be exaggerated by providing a suitable signal squaring circuit or any non-linear circuit between sensing device 20 and the input to the comparing units 13. If such an arrangement is employed, the corresponding reference signals will also be similarly altered.

Similarly if, because of printing variations, different signals are obtained when the same character is scanned, this difference may be decreased by providing a suitable rooting or non-linear circuit between the sensing device 20 and the comparing units 13.

Figure 7:
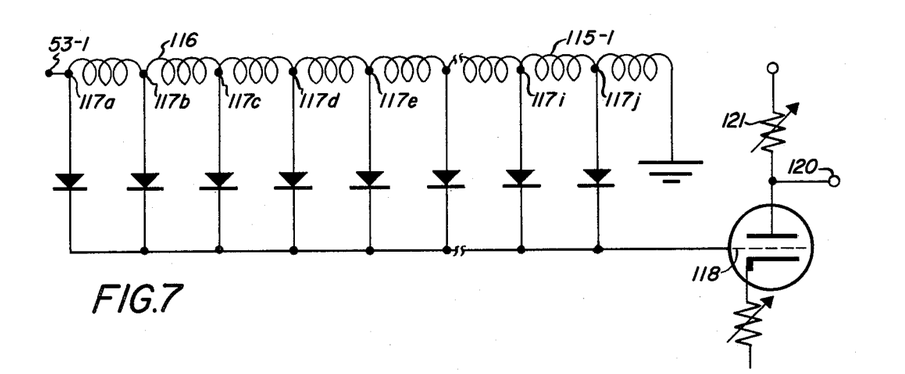
FIG. 7 illustrates schematically a modification of the pulse spacing detector unit shown in FIG. 6.

FIG. 7 illustrates schematically another example of a pulse spacing detector which may be employed in the system shown in FIG. 1. The pulse spacing detector 115–1 shown in FIG. 7 comprises a delay line 116 provided with a plurality of spaced taps 117a through 117j whose outputs are connected to the grid of triode 118. Input terminal 119 of delay line 116 would be connected to output terminal 53–1 of unit 13–1 or where a number of comparison circuits 40 are employed to output terminal 55–1 of comparing unit 13–1. In either case the series of pulses from the comparing unit 13–1 is applied to the delay 116 whose taps 117 are spaced electrically in accordance with the frequency of the $c$ pulses. The bias voltage applied to the grid of triode 118 depends upon the number of $c$ pulses which reach the taps 117a through 117j at the same instant. An indicating pulse is therefore provided at terminal 120 when the pulse train from comparing unit 13–1 contains a number of $c$ pulses above a fixed number determined by the setting of resistor 121.

Figure 8:
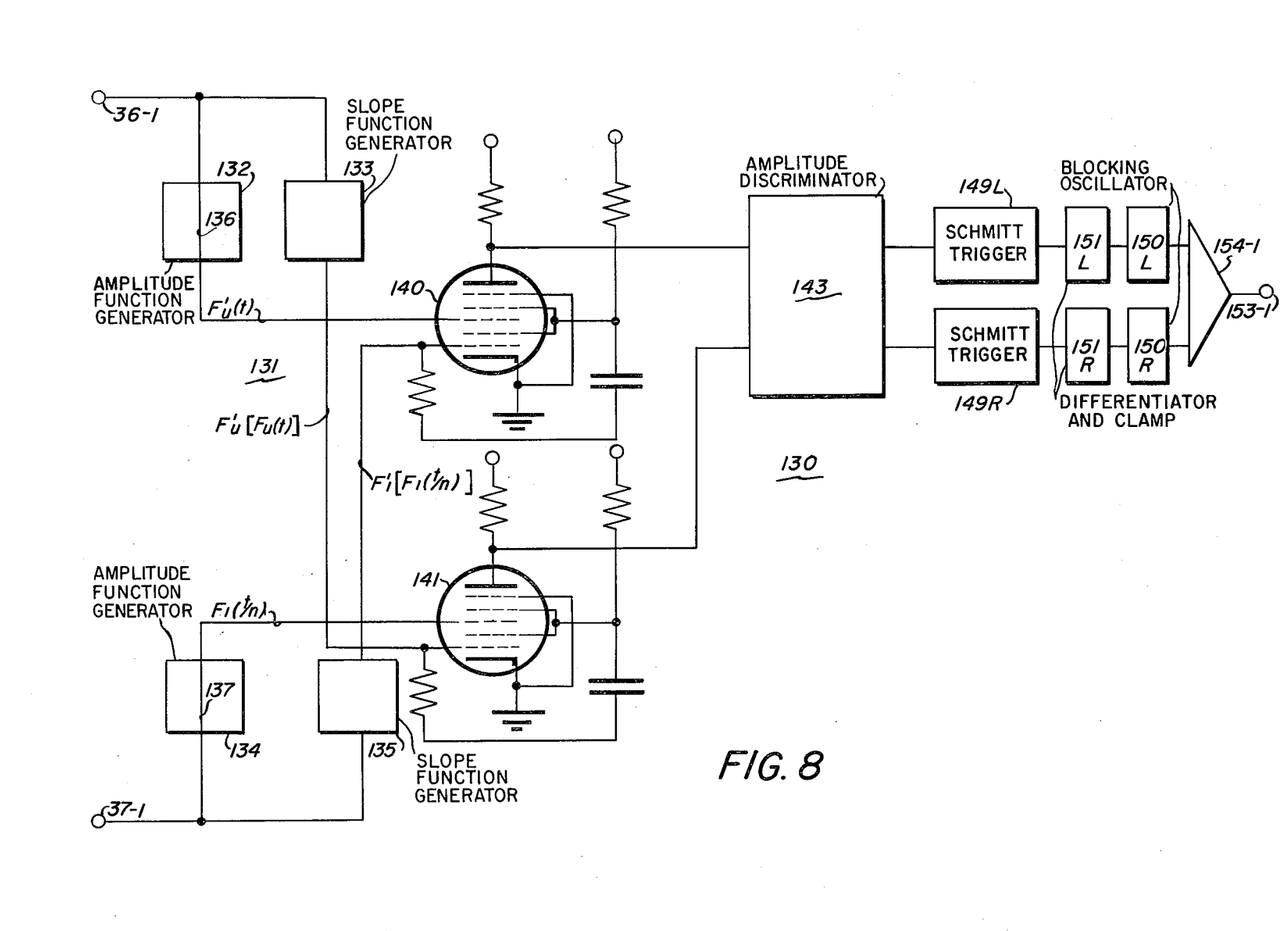
FIG. 8 illustrates schematically a modification of the comparing unit shown in FIG. 5.

FIG. 8 illustrates somewhat diagrammatically a further modification of the system shown in FIG. 1, in which the effect of the difference in peak amplitudes of the signals being compared is reduced to the extent that the AGC circuit may be eliminated. The comparing unit 130, shown in FIG. 8, is employed in place of the comparing units 13 shown in FIGS. 1 and 3 and operates on the principle that at coincidence the product of the unknown signal times the slope function for the reference signal is equal to the product of the reference signal times the slope function of the unknown signal.

The comparing unit 130 comprises a comparison circuit 131, a pair of function generators 132 and 133 which have their input terminals connected to terminal 36–1, and another pair of function generators 134 and 135 which have their input terminals connected to terminal 37–1. Function generators 132 and 134, as shown, are amplitude function generators and comprise merely conductors 136 and 137, although other linear devices may be employed. Function generators 133 and 135, as shown, are slope function generators and provide output signals which are the derivatives of the input signals, namely, slope functions. The function generators 133 and 135 may comprise any suitable differentiating circuits and hence are shown only diagrammatically by blocks.

The function generators 132 and 133 provide, respectively, two output signals $F_u(t)$ and $F'_u[F_u(t)]$ in response to an input signal $F_u(t)$ applied to terminal 36–1. Likewise, function generators 134 and 135 provide two output signals $F_1(t/n)$ and $F'_1[F_1(t/n)]$, the $F'$ functions being in this instance slope function signals.

Means, such as multi-electrode tube 140, is provided for multiplying the $F_u(t)$ signal by the $F'_1[F_1(t/n)]$ signal to obtain a first modulated signal. A similar multi-electrode tube 141 is provided for multiplying the $F_1(t/n)$ signal by the $F'_u[F_u(t)]$ signal to obtain a second modulated signal. Other suitable means may, of course, be employed to obtain the first and second modulated signals which are applied to the input terminals of amplitude discriminator 143. Discriminator 143 is identical in structure and operation to the amplitude discriminator 43 shown in FIG. 3 and therefore provides a series of pulses in response to amplitude coincidence between the two modulated signals. The series of pulses generated by the amplitude discriminator 143 will contain certain pulses $c$ similar to those shown in FIG. 4b when the $F_u(t)$ signal applied to terminal 36–1 corresponds to the $F_1(t)$ signal applied to terminal 37–1.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A system for identifying a predetermined unknown analog signal comprising comparing means, means for supplying said unknown signal to said comparing means, means for supplying to said comparing means an analog reference signal having a frequency which is a multiple of the frequency of the unknown signal and each cycle of which has substantially the same waveform as the unknown signal, said comparing means generating a pulse train containing predetermined spaced pulses in response to coincidence of a predetermined nature between said unknown signal and said reference signal and independently of the relative phase displacements between said unknown signal and said reference signal, and detector means operable in response to said predetermined spaced pulses.

2. A system for identifying a predetermined unknown analog signal comprising comparing means, means for supplying said unknown signal to said comparing means, means for supplying an analog reference signal having predetermined characteristics relative to said unknown signal to said comparing means, said comparing means generating a pulse train containing predetermined spaced pulses in response to coincidence of a predetermined nature between said unknown signal and said reference signal and independently of the relative phase displacements therebetween, said predetermined characteristics including frequency characteristics which are related by a fixed multiple, wave shape characteristics which are related by each cycle of the highest frequency signal corresponding to the wave shape of one cycle of the lower frequency signal, and amplitude characteristics wherein the peak amplitudes of the signals are substantially the same, and detector means operable in response to said predetermined spaced pulses.

3. A system for identifying a predetermined unknown analog signal comprising a comparing unit, means for supplying said unknown signal to said comparing unit, means for generating an analog reference signal having predetermined characteristics relative to said unknown signal, means for supplying said reference signal to said comparing unit, said comparing unit generating a pulse train containing equally spaced pulses independently of the relative phase displacement of said signals and in response to coincidence of a predetermined nature between said unknown signal and said reference signal, and means operable in response to said predetermined spaced pulses.

4. A system for identifying an unknown analog signal having a predetermined amplitude-vs.-time function comprising comparing means including a plurality of comparing units, means for supplying the unknown signal to each said comparing unit, means for supplying a different analog reference signal to each said unit, each said reference signal having a frequency which is a predetermined multiple of the frequency of the unknown signal, one of said reference signals defining a multi-cycle wave each cycle of which has a wave shape corresponding to the form of said unknown signal, each comparing unit providing a pulse in response to coincidence of a predetermined nature of said signals applied thereto whereby said comparing means provides a plurality of separate pulse trains independently of the phase relations between said unknown signal and each of said reference signals, and means for determining which of said separate pulse trains includes a series of pulses having a predetermined frequency.

5. A system for identifying an unknown analog signal having a predetermined amplitude-vs.-time function comprising signal comparison means, means for supplying the unknown signal to said comparing means, means for supplying a plurality of analog reference signals to said comparing means, each of said reference signals having a frequency which is a predetermined multiple of the frequency of the unknown signal and one of which defines a multicycle wave each cycle of which has a wave shape corresponding to the form of said unknown signal, control means for causing the peak amplitude of said unknown signal to be substantially the same as the peak amplitude of said reference signals, said comparing means including a plurality of signal comparing units each of which provides a separate pulse train in response to amplitude coincidence between said unknown signal and a different one of said reference signals independently of their phase relationship, and means for determining which of said separate pulse trains includes a series of pulses having a predetermined frequency.

6. A system for identifying an unknown analog signal having a predetermined amplitude-vs.-time function comprising comparing means including a plurality of comparing units, means for supplying said unknown signal to each said unit, means for supplying analog reference signals to said units, said reference signals each having a frequency which is a predetermined multiple of the frequency of the unknown signal, one of said reference signals defining a multi-cycle wave each cycle of which has a wave shape corresponding to the form of said predetermined function, said comparing unit supplied with said one reference signal having a first comparing circuit providing a first plurality of separate pulses in response to amplitude coincidence of the signals supplied thereto and a second comparing circuit providing a second plurality of pulses in response to coincidence of another nature between the signals supplied thereto, said first and second plurality of pulses each having a series of certain pulses which are in time phase relation independently of the phase relation between said unknown signal and said one reference signal, and other pulses which are arbitrarily spaced, and means responsive jointly to said series of certain pulses.

7. The combination recited in claim 6 wherein said jointly responsive means includes a gating circuit and a pulse spacing detector.

8. The system recited in claim 6 wherein said coincidence of another nature comprises slope coincidence.

9. A system for identifying an unknown analog signal defining a predetermined amplitude-vs.-time function by comparing said unknown signal individually with a plurality of stored analog reference signals each having a frequency which is a predetermined mutliple of the frequency of the unknown signal and one of which defines a multi-cycle wave each cycle of which has a wave shape corresponding to the form of said unknown signal, said system comprising a plurality of comparing units, means for supplying said unknown signal to each of said comparing units, means for storing said reference signals, means for supplying each of said stored reference signals to a different one of said comparing units, each comparing unit providing a pulse in response to coincidence of a predetermined nature between the stored reference signal supplied thereto and said unknown signal, said pulses generated by one of said comparing units whose supplied reference signal corresponds to said unknown signal defining a main pulse train containing certain pulses having a predetermined frequency, and means associated with said comparing units for providing an indication of the said one unit generating said main pulse train.

10. The invention recited in claim 9 wherein said one comparing unit includes a plurality of comparison circuits each of which generates a separate pulse in response to coincidence of a different predetermined nature to provide a plurality of auxiliary pulse trains, and means responsive to said auxiliary pulse trains for generating said main pulse train.

11. The invention recited in claim 10 wherein each of said comparison circuits is connected to said unknown signal supplying means through a different function generator corresponding to the nature of coincidence associated with said comparison circuit.

12. The invention recited in claim 11 wherein said reference signal supplying means includes means for supplying auxiliary analog reference signals to said comparison circuits which represent functions of said first reference signal corresponding respectively to the functions of said function generators.

13. The invention recited in claim 12 wherein said auxiliary reference signal supplying means comprises a magnetizable recording surface and a plurality of read transducers whose outputs are connected respectively to said comparison circuits.

14. A system for identifying an unknown analog signal defining a predetermined amplitude-vs.-time function by comparing said unknown signal individually with a plurality of stored analog reference signals each having a frequency which is a predetermined multiple of the frequency of the unknown signal and one of which defines a multi-cycle wave each cycle of which has a wave shape corresponding to one cycle of said unknown signal, said system comprising a plurality of comparing units, means for supplying said unknown signal to each of said comparing units, means for supplying each of said reference signals to a different one of said comparing units, each comparing unit comprising a comparison circuit including means for obtaining a first function signal which is a predetermined function of said unknown signal, means for obtaining a second function signal which is said predetermined function of said reference signal supplied to said unit, means for modulating said unknown signal with said second function signal to provide a first modulated signal, means for modulating said last mentioned reference signal with said first function signal to obtain a second modulated signal, and means responsive to coincidence of a predetermined nature between said first and second modulated signals for providing a pulse train, said pulse train generated by said unit whose reference signal corresponds to said unknown signal having certain pulses which define a predetermined frequency.

15. The invention recited in claim 14 in which said coincidence of a predetermined nature comprises amplitude coincidence.

16. The invention recited in claim 14 wherein said predetermined function is the first derivative.

17. The invention recited in claim 14 including detector means responsive to said certain pulses.

18. The invention recited in claim 17 wherein said detector means includes a magnetizable surface, a write transducer for magnetizing said surface in accordance with said pulse train, a plurality of read transducers positioned along the recording track traced by said write transducer and spaced in accordance with the frequency of said certain pulses, and means responsive to the joint outputs of said read transducers above a predetermined level for providing an indication pulse.

19. The invention recited in claim 18 wherein means are provided for adjusting said predetermined level.

20. The invention recited in claim 17 wherein said detector means includes a delay line having a plurality of taps spaced electrically in accordance with the frequency of said certain pulses, and means responsive to the sum of the tap voltages above a predetermined level for providing an indication pulse.

21. The invention recited in claim 20 including means for adjusting said predetermined level.

22. A system for comparing a first analog signal representable by the function $F_1(t)$ with an analog reference signal representable by the function $F_1(t/n)$ where "$n$" is a positive number, said system comprising a comparison circuit including a differential detector and a pair of voltage level sensing devices, means for supplying said first signal and said reference signal to the input terminals of said detector to provide pulses at the output terminals of said devices in response to amplitude coincidence of said supplied signals, and indicator means for providing an indication in response to a series of said pulses having a frequency $$\left(1-\frac{1}{n}\right)$$

times the frequency of the said reference signal.

23. The invention recited in claim 22 including means for adjusting the voltage level of said devices to cause said amplitude coincidence to extend over a selected range of voltage values.

24. A system for automatically recognizing information translatable into predetermined analog signals representable by the function $F(t)$ by comparing each of said predetermined signals with an associated stored analog reference signal representable by the function $F(t/n)$ to provide a series of pulses having a frequency $$\left(1-\frac{1}{n}\right)$$

times the frequency of the reference signal where "$n$" is equal to the frequency ratio of the reference signal and the predetermined signals, said system comprising a plurality of comparing units, means for sensing said information to provide an information signal $F_1(t)$ to each of said comparing units, means for storing a plurality of reference signals including reference signal $F_1(t/n)$, means for supplying each of said reference signals to a different one of said comparing units, each of said comparing units including means for providing an output pulse in response to coincidence of amplitude between said information signal $F_1(t)$ and its respective reference signal, a plurality of detectors each coupled with a different said comparing unit to provide an indicating pulse in response to a pulse train containing pulses having a frequency which is $$\left(1-\frac{1}{n}\right)$$

times the frequency of said reference signal.

25. A system for automatically recognizing printed characters, comprising sensing means for translating each of said characters into an analog character signal having a predetermined amplitude-vs.-time function characteristic, means for storing a plurality of analog reference signals which correspond to said character signals of the characters to be sensed, signal comparing means comprising a plurality of comparing units each of which is supplied with a different said reference signal, means for supplying the character signal from said sensing means to each of said comparing units, means for supplying each of said reference signals to a different said comparing unit at a rate which is a multiple M of the rate at which said character signal is supplied and at an arbitrary phase relation, each of said comparing units generating a pulse in response to coincidence of a predetermined nature between said character signal and its supplied reference signal, said comparing unit whose reference signal corresponds to the character signal from said sensing device generating a pulse train containing pulses which have a frequency which is $$\left(1-\frac{1}{M}\right)$$

times the frequency of the reference signals, and means responsive to pulses of said predetermined frequency.

26. A system for identifying a predetermined unknown analog signal comprising signal comparing means, means for supplying a predetermined analog reference signal to said comparing means, means for supplying said unknown signal to said comparing means, said reference signal and said unknown signal having different frequencies and an arbitrary phase relationship, said comparing means generating a pulse in response to coincidence of a predetermined nature between said signals regardless of their relative phase relationship, certain ones of said pulses defining a pulse train having a frequency which remains constant independently of said phase relationship and is determined by said frequency relationship of said signals, and detector means operatively coupled to said comparing means to detect said certain pulses.

27. The invention recited in claim 26 in which the frequency of said reference signal is a multiple or submultiple of said predetermined unknown signal.

References Cited in the file of this patent

UNITED STATES PATENTS

| | | |
|---|---|---|
| 2,526,425 | Schultheis | Oct. 17, 1950 |
| 2,663,758 | Shepard | Dec. 22, 1953 |
| 2,774,037 | Hansel | Dec. 11, 1956 |
| 2,794,965 | Yost | June 4, 1957 |
| 2,821,702 | Russell | Jan. 28, 1958 |
| 2,842,663 | Eckert | July 8, 1958 |
| 2,901,729 | Broadhead | Aug. 25, 1959 |